United States Patent [19]

Meador

[11] Patent Number: 5,354,015
[45] Date of Patent: Oct. 11, 1994

[54] SYSTEM FOR WARNING THE FLIGHT CREW ON BOARD AN AIRCRAFT OF PRE-FLIGHT AIRCRAFT ICING

[76] Inventor: Robert H. Meador, 550 Center Rd., Akron, Ohio 44319-4273

[21] Appl. No.: 105,350

[22] Filed: Aug. 10, 1993

[51] Int. Cl.$^5$ .............................. B64D 15/20
[52] U.S. Cl. ................. 244/134 F; 340/580; 340/602
[58] Field of Search ............. 244/134; 73/602, 178.7; 340/580, 582, 234, 602

[56] References Cited

U.S. PATENT DOCUMENTS

| | | | |
|---|---|---|---|
| 2,182,530 | 12/1939 | Baer | 244/134 |
| 2,269,019 | 1/1942 | Hall | 177/311 |
| 2,541,512 | 2/1951 | Hahn | 244/134 P |
| 2,656,525 | 10/1953 | Kinsella | 244/134 F |
| 2,739,302 | 3/1956 | Timbie | 244/134 F |
| 3,276,254 | 10/1966 | Richard | 73/170 |
| 3,287,974 | 11/1966 | Ciemochowski | 73/336.5 |
| 3,305,851 | 2/1967 | Brandtszteter | 340/234 |
| 3,422,677 | 1/1969 | Lockwood | 73/336.5 |
| 3,517,900 | 6/1970 | Roussel | 244/134 |
| 3,596,263 | 7/1971 | Ciemochowski | 340/234 |
| 3,596,264 | 7/1971 | Ciemochowski | 340/234 |
| 3,976,270 | 8/1976 | Catchpole | 244/134 F |
| 4,039,457 | 7/1977 | Volkner et al. | 244/134 D |
| 4,222,044 | 9/1980 | Boschung | 340/581 |
| 4,333,004 | 6/1982 | Forgue et al. | 219/497 |
| 4,506,994 | 3/1985 | Schwab | 374/28 |
| 4,628,736 | 12/1986 | Kirby et al. | 73/590 |
| 4,741,499 | 5/1988 | Rudolph et al. | 244/134 B |
| 4,833,660 | 5/1989 | Deom et al. | 367/157 |
| 5,206,806 | 4/1993 | Gerardi et al. | 340/582 |

*Primary Examiner*—Galen L. Barefoot
*Attorney, Agent, or Firm*—Eric Marich

[57] ABSTRACT

A warning system for detecting pre-flight aircraft icing employs parameter sensing means located at a plurality of locations along an aircraft structure, each of said sensing means positioned to sense an outer skin temperature of the aircraft structure at each of said locations and producing signals indicative thereof. Signal averaging means average said signals produced by said sensing means to produce signals representative of the average value of the outer skin temperature in a predefined area. Relative humidity sensing means produce a signal representative of the ambient relative humidity surrounding the aircraft structure prior to takeoff. Comparing means compare the outputs of said averaging means and said humidity sensing means with predetermined values of same defining an icing susceptibility region and produce a signal when the value of the sensed parameters falls within said region. Indicating means, connected to said comparing means and activated by a signal from the comparing means indicative of icing susceptibility, provide an indication to persons within a cockpit of the aircraft or to persons on the ground tending the aircraft of those sensed locations susceptible to icing.

19 Claims, 5 Drawing Sheets

SYSTEM FOR WARNING THE FLIGHT CREW ON BOARD AN AIRCRAFT OF PRE-FLIGHT AIRCRAFT ICING

FIELD AND BACKGROUND OF THE INVENTION

The present invention relates in general to on-board aircraft sensing and/or warning systems. In particular, the present invention relates to a system for warning the flight crew on board an aircraft of pre-flight icing on an outer skin of an aircraft structure, critical lifting surfaces, or control elements. The warning extends to the susceptibility to icing or snow accumulation during loading, taxiing, or takeoff.

Aircraft icing continues to be a hazard that affects lives and property wherever air transportation is used. A brief discussion of aircraft icing, in the context of in-flight icing, appears at page 57 of *Van Nostrand's Scientific Encyclopedia, Sixth Edition,* Douglas M. Considine, P.E., editor, Copyright © 1983. The airspace in which aircraft icing is most commonly encountered lies between the earth's surface and 20,000 feet (6000 meters). Several factors are involved in icing; i.e., the amount of supercooled water in the space swept out by the moving plane, the speed of the plane, drop and droplet size, and the temperature of the airspace.

Where drops and droplets freeze instantly, the water material does not have time to form a crystalline structure and the ice formation tends to be opaque, often granular with occluded air, usually less dense than clear ice, and frequently an irregular surface. This is called rime ice. When the liquid droplets and drops have time to crystallize, the ice formation tends to be more or less clear, usually near the density of ordinary ice and tends to assume the shape of the external aircraft surfaces over which it tends to spread as it freezes. This is called clear ice. Temperatures just less than freezing are conducive to clear icing and temperatures well below 0° C. (32° F.) are associated with rime icing. Aircraft icing is usually a mix of the two types with the proportion of the two related to the temperature.

The article concludes by stating that aircraft icing at one time in aviation history was a very serious problem, usually in winter, to all aircraft, and that it continues to be a serious problem for many smaller aircraft. The reason given for this distinction is that the current generation of transport and military aircraft are capable of nullifying the presence of icing conditions in numerous ways. Heated leading edges and surfaces can be built into the aircraft structure. Also, jet-engine aircraft tend to operate not only at speeds which produce a thermodynamic warming of the air immediately above the leading surfaces and edges, but also at altitudes well above 20,000 feet (6000 meters) where clouds are predominantly composed of ice crystals (an environment less conducive to icing). However, smaller propeller-driven aircraft, even those equipped with anti-icing devices, tend to be subjected to icing hazards in airspace where supercooled clouds and rain are present (an environment more conducive to icing).

It is clear that aircraft icing is still a problem. However, it is the present inventor's experience that the above article neglects a fundamental aspect of the real problem created by aircraft icing, namely that it is most dangerous during initial takeoff. Recent accidents at major airports around the world are clear proof that undetected, pre-flight icing conditions on the critical lifting surfaces of an aircraft can have deadly consequences.

At present, pre-flight icing detection is still a relatively primitive procedure. Weather reports advising of conditions ripe for icing usually lead to an actual visual or tactile inspection of the critical lifting surfaces. However, the size and extreme wingspan of today's modern aircraft often makes it difficult if not impossible to adequately visually inspect all the critical lifting surfaces. The pilot wants to know if the aircraft critical lifting surfaces are icing up, but once in the cockpit his ability to visually inspect these surfaces is limited. The pilot then has to rely upon the ground crew to an even greater degree. This problem becomes even more exacerbated at night or during low visibility conditions due to fog, snow, and the like. Even very little icing can be a serious problem.

If pre-flight icing is detected, and the aircraft is still at the main airport facilities, airport personnel implement their standard pre-flight deicing procedures. Various liquids using alcohol or similar substances are sprayed over the aircraft critical lifting surfaces and are effective in removing accumulated ice, and preventing its return for a limited period of time. However, if the aircraft taxis out towards the runway and encounters a delay which stacks up several aircraft during inclement weather, the deicing protection begins to runout. If the pre-flight delay is too long, the pilot will have no choice but to abort the flight, head back to the deicing area, and have the aircraft sprayed down again. While the value of human lives and property certainly warrant these efforts, a significant portion of airport operation delays and expense can be traced to these pre-flight deicing procedures. An unnecessary deicing procedure costs the same as a necessary one, and one can appreciate the magnitude of the problem if the cost of this one delay is multiplied by the dozens of airports around the world experiencing these conditions.

It is thus apparent that a system for warning the flight crew on board an aircraft (or the ground crew attending the aircraft) of pre-flight aircraft icing, i.e., of whether an outer skin of an aircraft structure is icing or is susceptible to icing, would be of great practical benefit not only to the airline industry, but also to the passengers and crew traveling aboard such aircraft.

SUMMARY OF THE INVENTION

Accordingly, one aspect of the present invention is drawn to a warning system for detecting pre-flight aircraft icing. The system can provide this warning to the flight crew on board the aircraft or to the ground crew attending same. Parameter sensing means are located at a plurality of locations along an aircraft structure, each of said sensing means positioned to sense an outer skin temperature of the aircraft structure at each of said locations and produce signals indicative thereof. Signal averaging means are provided for averaging the signals produced by said sensing means to produce signals representative of the average value of the sensed parameter in a predefined area. Relative humidity sensing means produce signals representative of the ambient relative humidity surrounding the aircraft structure prior to takeoff. Comparing means are provided for comparing the outputs of said averaging means and said humidity sensing means with predetermined values of same defining an icing susceptibility region and producing a signal when the value of the sensed parameters falls within said region. Finally, indicating means, connected to said comparing means and activated by a signal from the comparing means indicating icing susceptibility, provide an indication of those sensed locations susceptible to icing.

The various features of novelty which characterize the invention are pointed out with particularity in the claims annexed to and forming a part of this disclosure. For a better understanding of the invention, its operating advantages and the specific benefits attained by its uses, reference is made to the accompanying drawings and descriptive matter in which preferred embodiments of the invention are illustrated.

DESCRIPTION OF THE PREFERRED EMBODIMENTS

Figure 1:
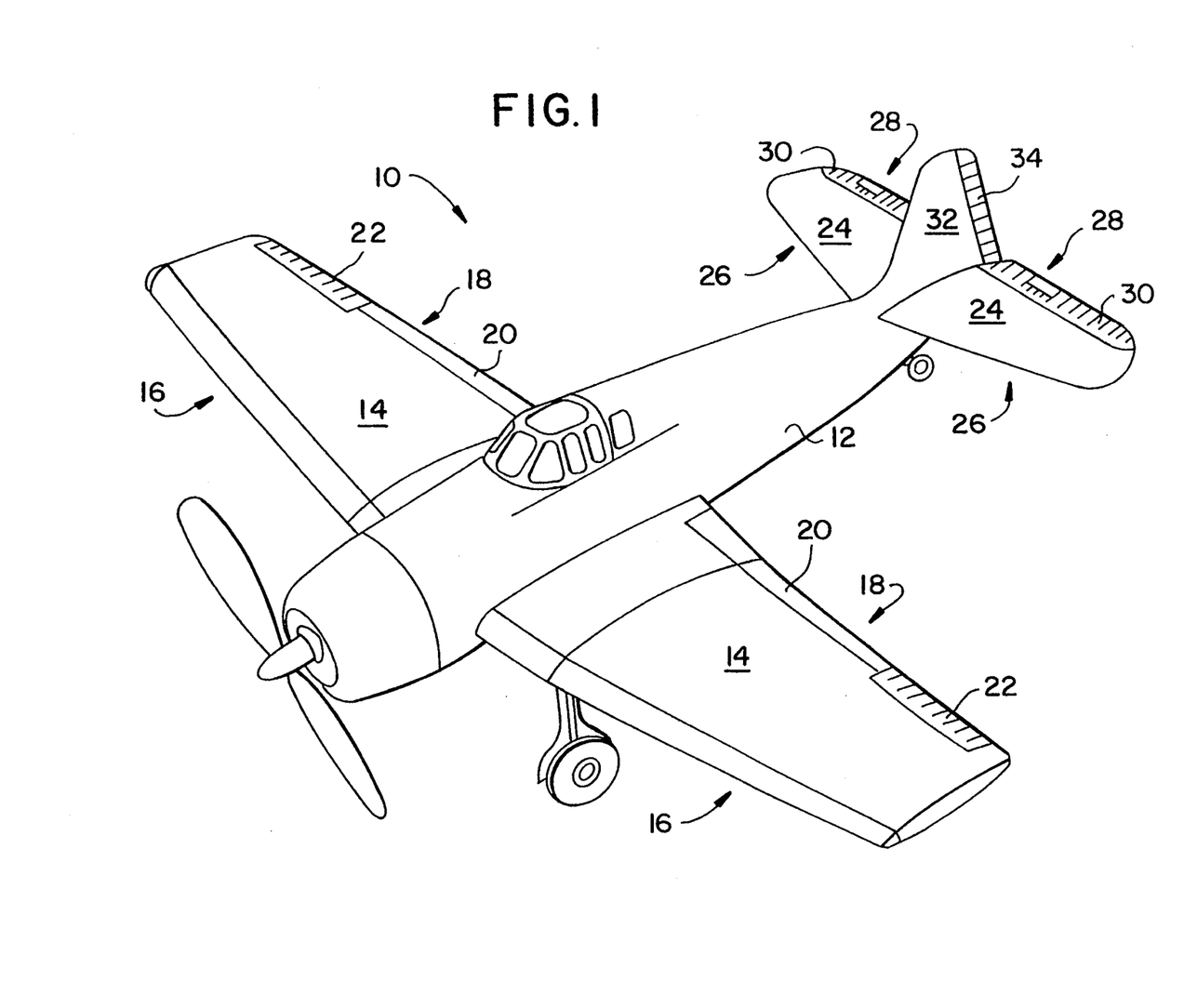
FIG. 1 is a perspective view of an aircraft to which the present invention may be applied.

Referring to the drawings generally, wherein like numerals represent the same or similar elements throughout the several drawings, and to FIG. 1 in particular, there is shown a perspective view of an aircraft 10 to which the present invention could be applied. Those familiar with military aircraft will recognize this illustration to be based upon the configuration of a Grumman F6F Hellcat, manufactured by the Grumman Aircraft Company. The Hellcat saw extensive service during World War II for the U.S. Navy as a carrier based fighter and for the U.S. Marine Corps as a fighter-bomber. Persons skilled in the art will appreciate that the present invention can be easily adapted to military or commercial aircraft, both propeller-driven and jet-engine, single or multiple engine, and that the use of this particular aircraft configuration in the Figures is by way of example only and not of limitation.

As shown in FIG. 1, the aircraft 10 has a fuselage 12 and critical lifting surfaces or wings 14 attached to a front portion of the fuselage 12 at the sides thereof. Each wing 14 has a leading edge 16 and a trailing edge 18. Located on each of the trailing edges 18 are flaps 20 and ailerons 22. At a rear portion of the fuselage 12 is a control stabilizer 24 attached at the sides of the fuselage 12, also having a leading edge 26 and a trailing edge 28. Located on each of the trailing edges 28 are elevators 30. A tail fin 32 having rudder 34 is attached to the fuselage 12 at a rear, upper portion thereof. Since the aforementioned various components and their functions are well known in the art, further details concerning same will not be provided unless necessary to fully explain the present invention.

Figure 2:
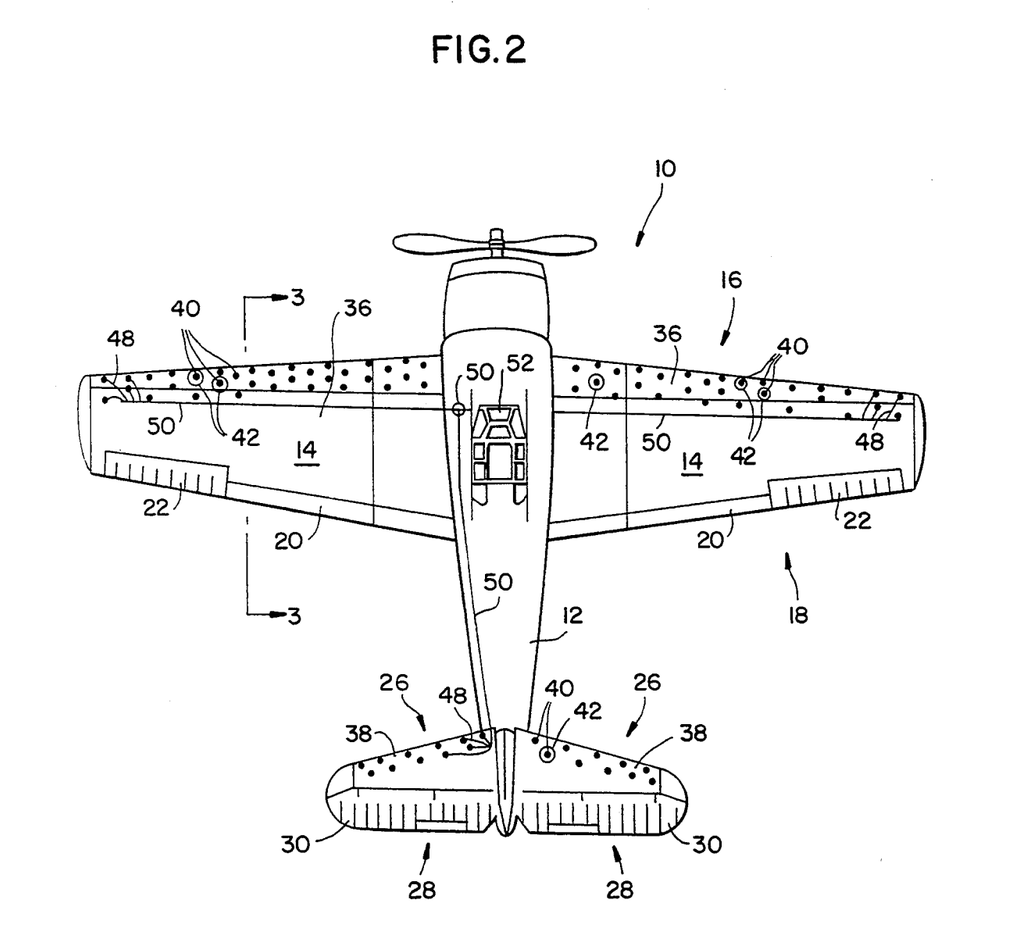
FIG. 2 is a plan view of the aircraft of FIG. 1, showing one arrangement of parameter sensing means located at a plurality of locations along an aircraft structure.

Referring now to FIG. 2, there is shown a first embodiment of the present invention, namely a system for indicating that an outer skin of an aircraft structure is susceptible to icing. Each wing 14 is comprised of an outer skin 36 placed over an internal structural frame (not shown), while each stabilizer 24 is also comprised of an outer skin 38 placed over an internal structural frame (not shown). Detecting icing of these critical lifting surfaces, i.e., surfaces which provide the lift required to achieve flight, is a primary purpose of the present invention. For the sake of brevity, the following discussion will focus upon application of the present invention to the critical lifting surfaces comprising the wings 14. However, the present invention can also be applied to provide information on the icing susceptibility of the stabilizer 24 as well, or for that matter, to any other aircraft structure exposed to the elements.

A plurality of parameter sensing pair means 40 comprising two (2) parameter sensors such as thermocouples and resistance temperature devices (RTD's) are located at a plurality of locations 42 along the wings 14. Each of the parameter sensing pair means 40 is positioned for sensing the value of a parameter representative of an outer skin temperature $T_s$ of the wings 14 at each location 42. The pairs of parameter sensing means 40 are preferably of different types of temperature sensing devices to insure that the temperature measurement is made by redundant devices not susceptible to the same potential failure conditions or mechanisms which would otherwise fail both redundant devices. The locations 42 are selected to provide a grid type array for the plurality of sensing pair means 40 preferably along the leading edges 16 of the wings 14, since this is where pre-flight accumulations of ice would have the greatest adverse effect, but could also be placed anywhere along the wings 14 where it is desired to detect icing.

The selection of the exact locations 42 would take into account any internal or external structures of wings 14 on a given aircraft 10. For example, some aircraft 10 have what are known as slats (not shown) at the leading edges 16 of the wings 14. These slats (not shown) are movably extendable from the leading edges of the wings 14 and used during braking of the aircraft 10 upon landing. Since the parameter sensing pair means 40 must be placed on that portion of the wings 14 that is susceptible to icing, in the case of wings 14 having movable slats (not shown), the locations 42 and the parameter sensing pair means 40 would be located just aft of the movable slats (not shown), as near to the leading edges 16 as possible. The locations 42 must be distributed along the wings 14 so that the parameter being sensed is representative of icing conditions along the wings 14.

In one embodiment, the parameter sensing pair means 40 comprise a thermocouple and an RTD affixed to an outer surface 44 of the outer skin 36 of the wings 14. The sensed parameter is thus outer skin temperature $T_s$. The interrelationship between the outer skin temperature $T_s$ and the ambient relative humidity will be used to determine icing susceptibility. Other temperature sensing elements could be used in duplicate or in pairs to form the parameter sensing means 40. Such elements are resistance temperature detectors (RTD's), thermistors, and integrated circuit temperature transducers (I.C. sensors).

Since it is a fundamental purpose of the present invention that it be applied as a retrofit to existing aircraft 10, as well as to new aircraft construction, it is preferable that thermocouples 40 are affixed to the outer skin 36 by affixing them to an outer surface 44 of the outer skin 36, embedding them in the outer skin 36 at a distance away from the outer surface 44, or affixing them to an inner surface 46 of the outer skin 36.

Figure 3A:
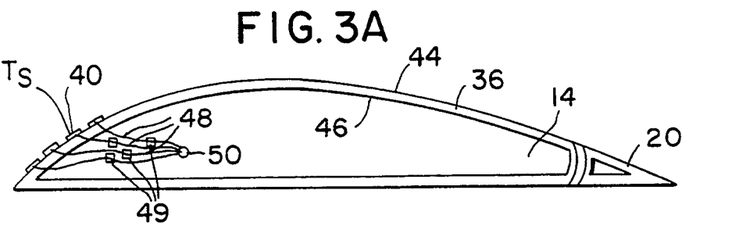
FIGS. 3a, 3b, and 3c are sectional view taken along line 3—3 of FIG. 2, showing various approaches to affixing the parameter sensing means to an aircraft structure.
Figure 3B:
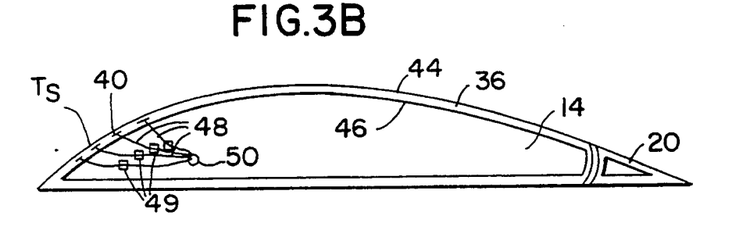
Figure 3C:
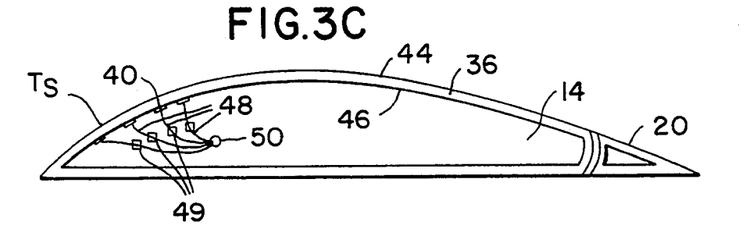

FIGS. 3a, 3b, and 3c illustrate these various approaches to affixing the thermocouples 40 to the outer skin 36 of the wings 14. In FIG. 3a, the thermocouples 40 are affixed directly to the outer surface 44 of the wings 14 by any known means appropriate for thermocouples. This type of installation will provide a direct measurement of the temperature of the outer surface 44. Leads 48 from each thermocouple 40 receive the signals produced by the thermocouples 40 and are collected within an interior portion of the wing 14 at cable 50, advantageously a coaxial cable.

In FIG. 3b, the thermocouples 40 are embedded in the outer skin 36 of the aircraft structure forming the wings 14 at a distance away from the outer surface 44, if necessary for aerodynamic, structural, or other mounting considerations. Holes for the thermocouples 40 could be emplaced in the outer skin 36, from either the outer surface 44 or the inner surface 46, depending upon accessibility. In the alternative, the thermocouples 40 could be sandwiched between layers of outer skin 36 that comprise the wing 14, if that type of construction is employed. The leads 48 are again collected within an interior portion of the wing 14 at cable 50.

In FIG. 3c, it is shown that it is also possible to affix the thermocouples 40 to an inner surface 46 of the outer skin 36 of the aircraft structure forming the wings 14. In this case, it may be necessary to compensate through calibration or other means, for the temperature drop through the thickness of the outer skin 36 comprising the wing 14, so that the temperature sensed at the inner surface 46 can be directly related to and representative of the outer surface temperature $T_S$. Such calculations would, of course, involve the thermal properties of the material forming the outer skin 36, and are well known to anyone skilled in heat transfer. It is envisioned, however, that since most wing 14 structures employ thin, metallic outer skin 36 components, the temperature drop across the thickness of the outer skin 36 would be negligible and could thus be ignored for most practical purposes.

The thermocouples 40 should be selected to accurately measure temperatures in the range of $-18°$ C. to $4°$ C. ($0°$ F. to $40°$ F.), to encompass the range where water will begin to freeze upon the outer surface 44. However, since the system of the present invention will be on the wings 14 throughout the year, the thermocouples 40 as well as the means used to affix them to the sensed surfaces must be capable of withstanding a range of temperatures likely to be encountered without adding temperature effects to the thermocouples 40. Practically, this requires the thermocouples 40 and their mounting means to be able to withstand a temperature range of $-76°$ C. to $93°$ C. ($-60°$ F. to $200°$ F.) without failure of the thermocouples 40 or their mounting means to the outer skin 36. This range was selected to encompass the range of temperatures seen in some locations during the winter, or the temperature a metal surface can reach when exposed to the sun in the summer.

In each embodiment of FIGS. 3a, 3b, and 3c, with reference to FIG. 2, the cable 50 for the wings 14 extends along the length thereof towards a cockpit 52 of the aircraft 10. As indicated earlier, however, the present invention can also be applied to provide information on the icing susceptibility of the control stabilizer 24 as well. In that situation a similar arrangement of thermocouples 40 would be employed on the stabilizer 24, and a cable 50 would then extend from the leads 48 attached to the thermocouples 40 in the control stabilizer 24, along the fuselage 12 and into the cockpit 52 so as to permit persons therein to check the icing susceptibility of the aircraft structure. As will be discussed later, the cable 50 can also extend to a location on the underside of the aircraft 10 so as to permit persons on the ground to check the icing susceptibility of the aircraft structure while the aircraft 10 is still on the ground.

In another preferred embodiment of the present invention, the parameter sensing pair means 40 would advantageously comprise a pair of strain gages affixed to the aircraft structure with the sensed parameter being temperature-induced strain. These strain gages 40 could be affixed to either the outer surface 44 of the outer skin 36, or the inner surface 46 thereof by any known means. The strain gages 40 would be selected to measure and operate within the temperature ranges as discussed above in connection with the thermocouples affixed to the outer skin 36. The strain gages could be of various types, such as bonded wire or foil gages and the like.

Figure 4:
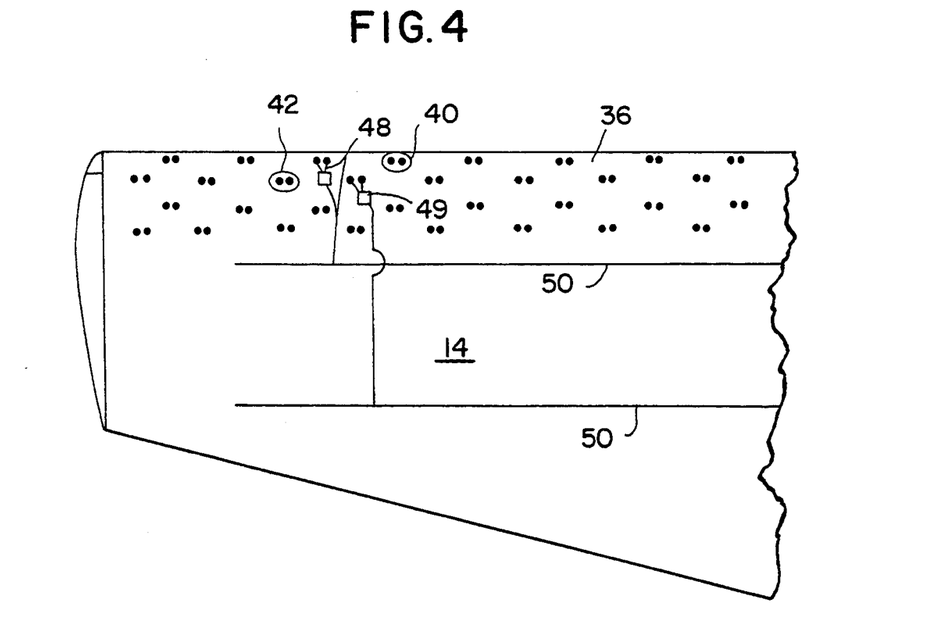
FIG. 4 is a plan view of a portion of the aircraft structure of FIG. 2, enlarged for clarity to illustrate another aspect of the present invention.

FIG. 4 shows another aspect of the present invention wherein separate cables 50, positioned at different internal locations within the wings 14, are employed for each of the parameter sensing pair means 40 at a given location so that failure of one cable 50 would not take out both of the parameter sensing pair means 40 at a given location 42.

Figure 5:
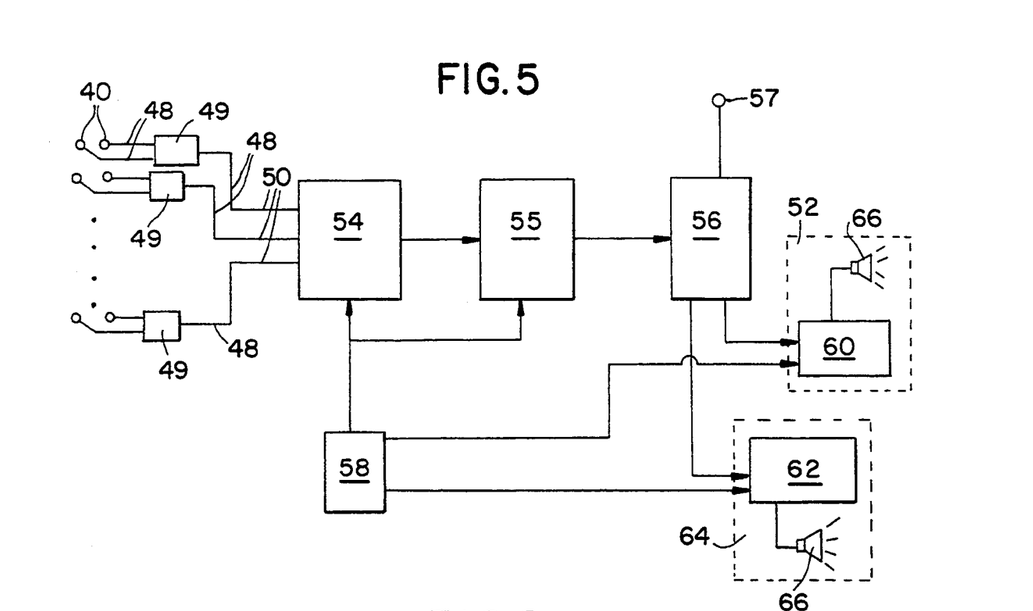
FIG. 5 is a schematic of the various components of the system of the present invention.

FIG. 5 shows a schematic of the various components of the system of the present invention. Each parameter sensing pair means 40 is connected to a known discriminating HI/LO circuit 49 which passes the low of the two sensed temperatures sensed by the parameter sensing pair means 40 along leads 48 to cable 50. The lowest outer surface temperature $T_S$ at each location 42 is thus detected. Since there are numerous parameter sensing locations 42 on the wing 14, each with its own discriminating HI/LO circuit 49, each wing 14 is subdivided into areas having several parameter sensing pair means 40 and the signals produced by the parameter sensing pair means 40 in each area are discriminated and averaged to obtain a representative average value for the sensed temperature parameter in each area. For example, each wing 14 could be subdivided along its length into an outer third, a middle third, and an inner third nearest the fuselage 12. Averages based upon other fractional subdivisions along the length or breadth of the wings 14 could also be employed. Averaging the data from a plurality of locations 42 simplifies the signal processing requirements, since fewer data signals need to be analyzed, rather than the dozens of signals produced by each of the parameter sensing pair means 40. Cables 50 are thus connected to signal averaging means 54 which receives the signals from each of the discriminating HI/LO circuits 49 and produces signals representative of the average value of the sensed parameter in each predefined area. The averaging means 54 could employ known adding circuits which sum the signals provided along cables 50 and transmit the sum to a divider circuit which divides the sum by the number of discriminating HI/LO circuits 49. Signals representative of the average value of the sensed parameter in each predefined area are then sent to a filter amplifier means 55 if signal enhancement is necessary. The enhanced signals representative of the average value of the sensed parameter in the predefined area are then sent to comparing means 56. Comparing means 56 is also connected to a relative humidity sensor 57, mounted on the aircraft structure so as to sense the ambient relative humidity surrounding the aircraft prior to takeoff.

Comparing means 56 takes each signal representative of the average value of the sensed parameter in each predefined area and, together with a relative humidity signal provided from relative humidity sensor 57, enters a programmable look-up table provided therein. The look-up table contains critical values of the sensed temperature and relative humidity parameters that are representative of an outer skin temperature $T_s$ at which the aircraft structure is susceptible to icing (i.e., outer surface temperatures $T_s$ of the outer skin 36 at which water will begin to freeze thereupon) at a given relative humidity. Critical values of the sensed parameters representative of the outer skin temperature $T_s$ can easily be determined by experimentation for each relative humidity value and programmed into the look-up table provided within comparing means 56, and thus define an icing susceptibility region when the sensed parameters are below these look-up table values. If a conservative approach is desired, the comparing means 56 could be configured to artificially adjust the average value of the sensed parameter by a preselected amount to indicate a lower outer surface temperature $T_s$ before entering the look-up table, to account for differences in calibration of individual parameter sensing pair means 40. The comparing means 56 could also comprise a programmable microcircuit having an empirically derived equation which is a function of temperature and relative humidity as inputted by the units 55 and 57. The calculated output would then be compared in a scanning stat ion and an alarm output generated when a certain error signal is exceeded.

Comparing means 56 identifies any predefined area where the value of the sensed parameter fell within the icing susceptibility region either in the look-up table or as calculated and produces a signal representative thereof which is transmitted to indicating means 60, 62. Power supply 58 provides electricity to the signal averaging means 54, signal amplifier filter means 55, and comparing means 56 as required by the type of signals produced by the parameter sensing pair means 40.

Indicating means 60, 62 are connected to comparing means 56 for receiving the signals representative of the sensed areas of the predefined areas susceptible to icing to provide an audible and/or visual indication of the sensed areas. Similar circuits could be made to cover the other areas. The indicating means 60 is located within the cockpit 52 of the aircraft 10 to permit the crew to immediately determine the icing susceptibility of the aircraft structure prior to takeoff. The indicating means 62 is located externally of the cockpit 52 so as to permit the aircraft ground crew to immediately determine the icing susceptibility of the aircraft structure prior to takeoff. One location would be on the underside of the aircraft 10 on the fuselage 12, schematically being represented by element 64.

Preferably, both indicating means 60, 62 would be visual displays which provide, at the very minimum, a light that would become brightly illuminated if the average value of any sensed parameter in a predefined area at a given relative humidity fell within the icing susceptibility region as defined by the look-up table or calculated values. Both indicating means 60, 62 could also be augmented with an audible alarm 66.

Figure 6:
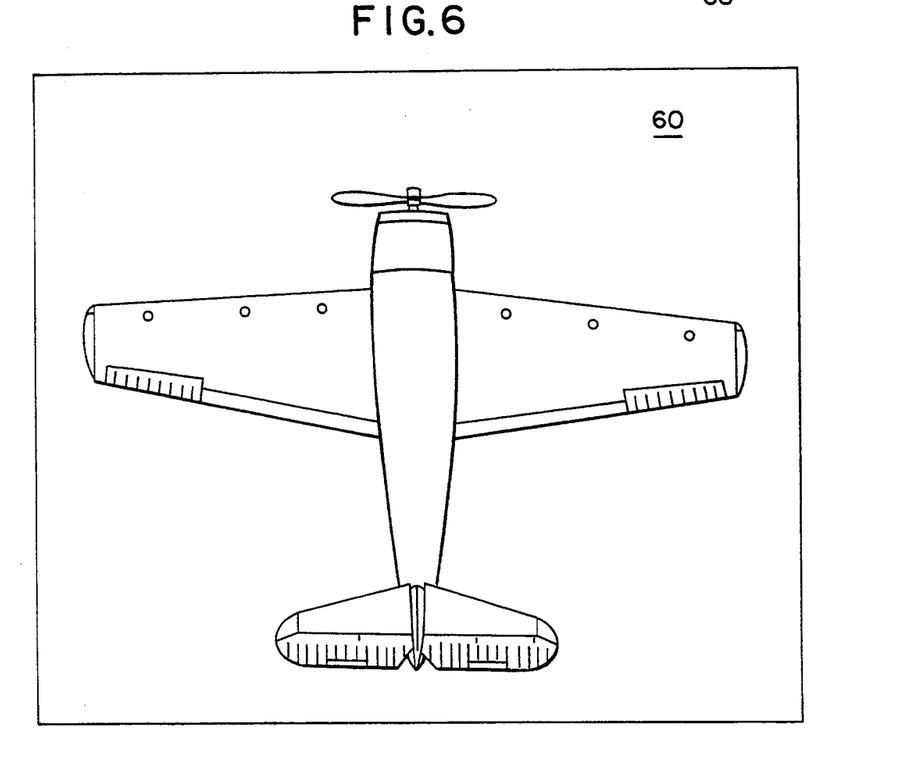
FIG. 6 is an illustration of a display means used in the invention.

Referring now to FIG. 6, the indicating means 60 within the cockpit 52 would advantageously be a visual display in the form of a symbolic representation of the aircraft structure. Since there are numerous parameter sensing locations 42 on the aircraft structure, the display would comprise lights, each corresponding to the predefined area parameter sensing locations on the aircraft structure. The display would parallel the groupings of the parameter sensing locations that are averaged together in each predefined area. For example, if each wing 14 was subdivided along its length into an outer third, a middle third, and an inner third nearest the fuselage 12, a single light would be provided on the display to represent each one third area. Of course, other fractional subdivisions could be employed to correspond to the parameter sensing locations 42 and how they were assigned to any predefined areas.

The display 60 preferably operates so that each predefined area is represented by a light. Any area where icing is susceptible would be represented by an illuminated light, and any area where there is no icing susceptibility would be represented by an unilluminated light. In addition to providing an indication of the icing susceptibility of the aircraft structure, the signals produced by the comparing means 56 of the present invention could also be used to automatically activate an on-board aircraft deicing system in the aircraft structure if the average value of a sensed parameter in any predefined area falls within the critical region as defined by the look-up table values.

Figure 7:
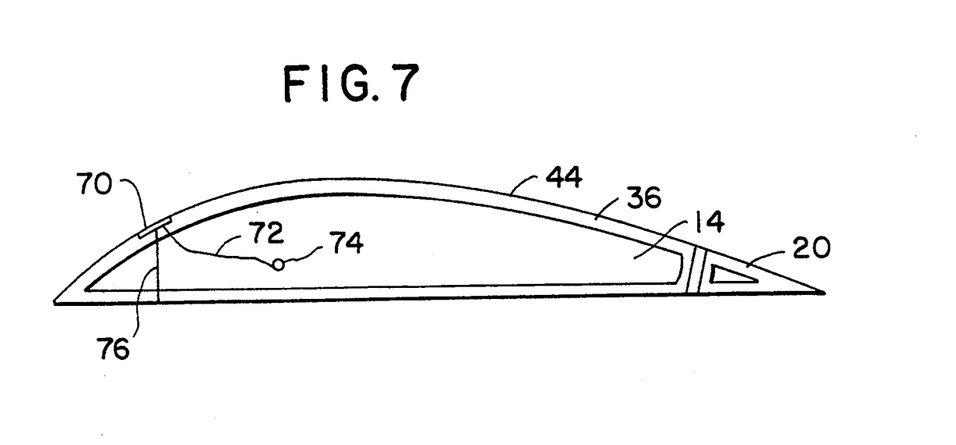
FIGS. 7 and 8 are, respectively, sectional and plan views of a portion of an aircraft structure showing another embodiment of the present invention.
Figure 8:
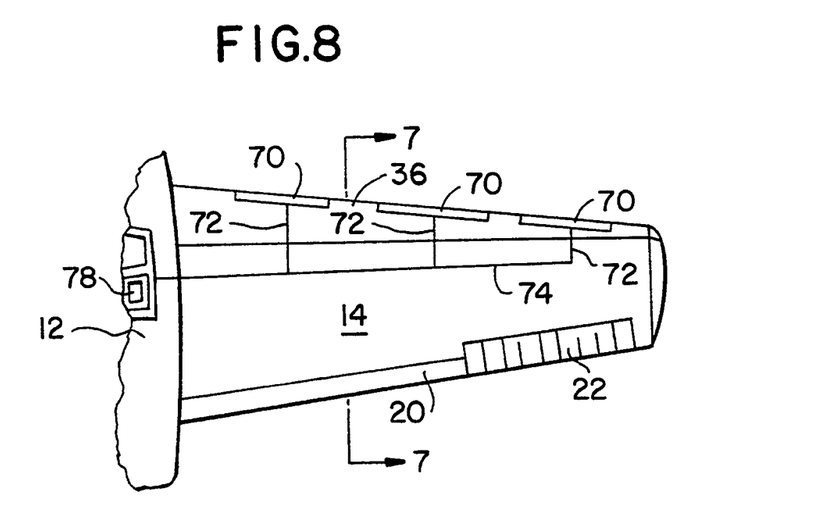

FIGS. 7 and 8 are, respectively, sectional and plan views of a portion of an aircraft structure or wing 14 showing another embodiment of the present invention. This embodiment employs a channel 70 emplaced on a leading edge 16 of the wing 14. The channel 70 is placed in the outer skin 36 and is used to sense the presence or absence of any wind velocity thereacross. To serve that end, the channel 70 is connected by means of branch tubing 72 to a main tube 74 that communicates with the cockpit 52. The channel 70 can have a longitudinal slit or a plurality of holes therein that communicate with the ambient air in the vicinity of the wing 14. The main tube 74 is preferably connected to an anemometer or barometric pressure sensing device 78 of known construction to provide a reading of the atmospheric pressure or wind velocity in the vicinity of the wing 14. The channel 70 could comprise a plurality of separate channels 70 arranged at discrete intervals along the length of the wing 14. As long as any wind velocity is present flowing across the channel 70, the pressure or wind velocity sensing means will produce a fluctuating reading indicating that the channel 70 is unobstructed; a steady pressure reading or a reading of no wind velocity indicates that the channel 70 is obstructed.

During weather conditions that are conducive to producing icing of the wings, a fluctuating or nonzero wind velocity reading indicates that the channel means is unobstructed and not icing over, while a non-fluctuating or zero wind velocity reading during weather conditions conducive to icing indicates that the channel means is obstructed and possibly icing over. If the winds are very light, the pilot may have to wait until he begins to taxi out towards the runway, where a definite wind velocity over the wings will occur, before relying on the wind velocity reading or lack thereof. While this is only a possible indication to the pilot that icing of the wings 14 has occurred, he at least has the option of investigating further and he can take whatever further action his judgement and experience demands. To take care of rainy conditions where the channel 70 could be partially filling with water, a drain tube 76 could be employed to drain the channel 70.

While in accordance with the provisions of the statutes there are illustrated and described herein specific embodiments of the invention, those skilled in the art will understand that changes maybe made in the form of the invention covered by the claims, and that in applying the principles of the present invention certain features of the invention may sometimes be used to advantage without a corresponding use of the other features. Accordingly, it is thus understood that all such modifications and improvements have been deleted herein for the sake of conciseness and readability but are properly within the scope of the following claims. An example of such would be to convert the shown analog circuit to a digital circuit more in tune with today's control concepts. This could be accomplished by the addition of analog to digital A/D and digital to analog D/A circuits at the cables 50 and at the outputs of comparing means 56, respectively. An amplifier may be required after the D/A circuit to raise the signal level to one sufficient to activate the displays 60 and 62.

I claim:

1. A warning system for detecting pre-flight aircraft icing, comprising:
    parameter sensing means located at a plurality of locations along an aircraft structure, each of said sensing means positioned to sense an outer skin temperature of the aircraft structure at each of said locations and producing signals indicative thereof;
    signal averaging means for averaging said signals produced by said sensing means to produce signals representative of the average value of the outer skin temperature in a predefined area;
    relative humidity sensing means for producing a signal representative of the ambient relative humidity surrounding the aircraft structure prior to takeoff;
    comparing means for comparing the outputs of said averaging means and said humidity sensing means with predetermined values of same defining an icing susceptibility region and producing a signal when the value of the sensed parameters falls within said region; and
    indicating means, connected to said comparing means and activated by a signal from the comparing means indicative of icing susceptibility.

2. The system of claim 1, wherein the aircraft structure is an aircraft critical lifting surface.

3. The system of claim 1, wherein the aircraft structure is an aircraft control surface.

4. The system of claim 1, wherein the parameter sensing means are thermocouples affixed to the outer skin of the aircraft structure.

5. The system of claim 4, wherein said thermocouples are affixed to an outer surface of the outer skin of the aircraft structure.

6. The system of claim 4, wherein said thermocouples are embedded in the outer skin of the aircraft structure at a distance away from an outer surface of the outer skin of the aircraft structure.

7. The system of claim 4, wherein said thermocouples are affixed to an inner surface of the outer skin of the aircraft structure.

8. The system of claim 1, wherein the parameter sensing means comprise a pair of parameter sensors of two different types of temperature sensing devices to insure that the temperature measurements at each location are made by redundant devices not susceptible to the same potential failure conditions or mechanisms.

9. The system of claim 8, wherein one of said sensors is a thermocouple and the other is an RTD.

10. The system of claim 8, further comprising a discriminating HI/LO circuit connected to each pair of parameter sensors to pass the low of the two sensed temperatures to said signal averaging means.

11. The system of claim 1, wherein the comparing means includes a programmable look-up table having critical values of the sensed outer skin temperature and relative humidity parameters that are representative of an outer skin temperature $T_s$ at which the aircraft structure is susceptible to icing.

12. The system of claim 1, wherein the comparing means includes a programmable microcircuit having an empirically derived equation which is a function of the sensed temperature and relative humidity and which defines the icing susceptibility region.

13. The system of claim 1, wherein the indicating means is an audible alarm audible to persons within a cockpit of said aircraft.

14. The system of claim 1, wherein the indicating means is a visual display located so that persons within a cockpit of the aircraft will be apprised of pre-flight aircraft icing susceptibility.

15. The system of claim 14, wherein the visual display is a graphical representation of sensed areas on the aircraft structure operative so that any area where icing is susceptible is represented by an illuminated light, and any area where there is no icing susceptibility is represented by an unilluminated light.

16. The system of claim 1, wherein the indicating means is an audible alarm audible to persons on the ground attending the aircraft so that they will be apprised of pre-flight aircraft icing susceptibility.

17. The system of claim 1, wherein the indicating means is a visual display located so that persons on the ground attending the aircraft will be apprised of pre-flight aircraft icing susceptibility.

18. A warning system for detecting pre-flight aircraft icing, comprising:
    strain gage means located at a plurality of locations along an aircraft structure, each of said strain gage means positioned to sense temperature-induced strain corresponding to an outer skin temperature of the aircraft structure at each of said locations and producing signals indicative thereof;
    signal averaging means for averaging said signals produced by said strain gage means to produce signals representative of the average value of the outer skin temperature in a predefined area;
    relative humidity sensing means for producing a signal representative of the ambient relative humidity surrounding the aircraft structure prior to takeoff;
    comparing means for comparing the outputs of said averaging means and said humidity sensing means with predetermined values of same defining an icing susceptibility region and producing a signal when the value of the sensed parameters falls within said region; and indicating means, connected to said comparing means and activated by a signal from the comparing means indicative of icing susceptibility.

19. The system of claim 18, wherein the comparing means includes a programmable look-up table having critical values of the sensed outer skin temperature corresponding to the sensed temperature-induced strain and relative humidity parameters that are representative of an outer skin temperature $T_s$ at which the aircraft structure is susceptible to icing.

* * * * *